(12) United States Patent
Martienssen et al.

(10) Patent No.: US 8,890,476 B2
(45) Date of Patent: Nov. 18, 2014

(54) FUEL CELL/SUPERCAPACITOR/BATTERY POWER SYSTEM FOR VEHICULAR PROPULSION

(75) Inventors: Werner Oskar Martienssen, Dreieich (DE); Roslinda Martienssen, legal representative, Dreieich (DE); Glyn Jeremy Reynolds, Largo, FL (US)

(73) Assignee: Oerlikon Advanced Technologies AG, Balzers (LI), by said Rosalinda Martienssen, Werner Oskar Martienssen (Deceased) Dreieich, Germany ( * ) Notice: Subject to any disclaimer, the term of this patent is extended or adjusted under 35 U.S.C. 154(b) by 467 days.

(21) Appl. No.: 13/389,370

(22) PCT Filed: Aug. 3, 2010

(86) PCT No.: PCT/CH2010/000188
§ 371 (c)(1),
(2), (4) Date: Apr. 16, 2012

(87) PCT Pub. No.: WO2011/014971
PCT Pub. Date: Feb. 10, 2011

(65) Prior Publication Data
US 2012/0187906 A1 Jul. 26, 2012

Related U.S. Application Data

(60) Provisional application No. 61/232,068, filed on Aug. 7, 2009, provisional application No. 61/232,071, filed on Aug. 7, 2009.

(51) Int. Cl.
*H02J 7/00* (2006.01)
*H01G 11/56* (2013.01)
(Continued)

(52) U.S. Cl.
CPC ............... *H01G 9/155* (2013.01); *H01G 11/56* (2013.01); *H01G 11/70* (2013.01); *H01G 11/00* (2013.01); *H01G 11/04* (2013.01); *Y02T 10/7022* (2013.01); *H01G 9/058* (2013.01); *H01G 11/24* (2013.01); *H01G 9/038* (2013.01); *Y02E 60/13* (2013.01)
USPC ............ 320/109; 361/505; 361/512; 307/109

(58) Field of Classification Search
CPC ...................................................... Y02T 90/14
USPC ......................................................... 320/109
See application file for complete search history.

(56) References Cited

U.S. PATENT DOCUMENTS 5,585,999 A * 12/1996 De Long et al. ............... 361/505
2005/0088140 A1 * 4/2005 Bushong et al. ............... 320/107

(Continued)

FOREIGN PATENT DOCUMENTS

| FR | 2 757 806 A1 | 7/1998 |
| GB | 2 416 631 A | 2/2006 |
| JP | 5-74656 A | 3/1993 |

OTHER PUBLICATIONS

International Search Report cited in PCT Application No. PCT/CH2010/000188 dated Apr. 4, 2011, two (2) pages.

*Primary Examiner* — Yalkew Fantu
(74) *Attorney, Agent, or Firm* — Nath, GOldberg & Meyer; Jerald L. Meyer; Stanley N. Protigal (57) ABSTRACT

The present invention provides a power system for a vehicle. The power system comprising a supercapacitor-like electronic battery that is connected to a battery charger. The battery charger provides energy to the supercapacitor-like electronic battery. A heater is operatively connected to the supercapacitor-like electronic battery to provide energy to heat the supercapacitor-like electronic battery thereby lowering the internal impedance of the supercapacitor-like electronic battery. A charging apparatus is operatively connected to the battery charger. A motor is operatively connected to the vehicle and the supercapacitor-like electronic battery. A feedback loop controller is operatively connected to the heater, the supercapacitor-like electronic battery and the motor.

12 Claims, 7 Drawing Sheets

(51) Int. Cl.
*H01G 11/70* (2013.01)
*H01G 11/00* (2013.01)
*H01G 11/04* (2013.01)
*H01G 9/04* (2006.01)
*H01G 11/24* (2013.01)
*H01G 9/022* (2006.01)
*H01G 9/00* (2006.01)

(56) References Cited

U.S. PATENT DOCUMENTS

2005/0241865 A1\* 11/2005 Varenne ................ 180/65.1
2006/0097577 A1\* 5/2006 Kato et al. .............. 307/10.1
2007/0090808 A1\* 4/2007 McCabe et al. ......... 320/137

\* cited by examiner

FUEL CELL/SUPERCAPACITOR/BATTERY POWER SYSTEM FOR VEHICULAR PROPULSION

CROSS REFERENCES TO RELATED APPLICATIONS

This application claims priority from and is related to commonly owned U.S. Provisional patent application Ser. No. 61/232,068 filed Aug. 7, 2009, entitled: All Solid-State Electrochemical Double Layer Supercapacitor, and U.S. Provisional patent application Ser. No. 61/232,071 filed Aug. 7, 2009, entitled: Fuel Cell/Supercapacitor/ Battery Power System for Vehicular Propulsion, these Provisional Patent Applications incorporated by reference herein.

FIELD OF THE INVENTION

The present invention relates to solid-state energy-storage devices, and, more particularly, to electrolyte films in such devices. This invention also relates to methods and systems for using these storage devices to propel vehicles.

BACKGROUND OF THE INVENTION

The world's known oil reserves are dwindling at an ever increasing rate as developing nations industrialize and demand increases. The price of oil exceeded $100 per barrel in 2008 and is very likely to become even more expensive in the future. For electricity generation, there are many alternatives to oil-fired power stations: natural gas, coal, nuclear and hydro-electric power stations are already widely deployed throughout the United States and other industrialized nations. However, burning both natural gas and coal leads to an increase of carbon dioxide levels in our atmosphere and as global warming accelerates and governments seek to address this growing concern, there has been much recent interest in renewable energy sources such as solar, wind and tides.

Most automobiles on the road today use gasoline or diesel fuel that is produced from crude oil. Unless we can convert these vehicles to run on some other form of energy, our transportation options will be significantly impacted by higher oil prices. Some of the cars of the future might run on hydrogen, natural gas, liquefied petroleum gas, bio-diesel or electricity. It is the purpose of this invention to provide a vehicular propulsion option that exploits the various advantages of fuel cells, capacitors and batteries and that optimizes the net energy balance involved in fabricating and operating this power system.

It is well understood that fuel cells are very efficient devices at converting chemical energy into electricity. The most efficient and flexible fuel cell technology available today is the solid oxide fuel cell (SOFC) that can operate on many different kinds of hydrocarbons or on hydrogen gas. The main disadvantages to SOFCs are that they operate at high temperatures and that they emit $CO_2$ if they use hydrocarbon fuel. Other kinds of fuel cells such as direct injection methanol and hydrogen fuel cells run much cooler, though the former still produce $CO_2$ according to the overall chemical reaction:

$$2CH_3OH+3O_2=2CO_2+4H_2O$$

Another drawback to using fuel cells for vehicular applications is that they are very costly per Watt of power generated when compared to a battery or a capacitor. When considering how large a fuel cell is required for a particular vehicular propulsion application, it is most economical to size the fuel cell according to the maximum average power that is required and to provide an auxiliary means of energy storage to provide additional power when accelerating, driving up steep inclines, etc.

Today's hybrid-electric and plug-in electric vehicles mainly use nickel-metal hydride (NiMH) or Li-ion batteries; earlier models that used relatively inexpensive but heavy lead acid batteries have been largely retired. Most pundits believe that in the future, most electric cars will use Li-ion batteries similar to those used in the Tesla Roadster or soon to be released Chevrolet Volt. The battery packs for these cars are very expensive and require a lot of energy to manufacture. Unfortunately, as most users of lithium-ion batteries in cell phones and laptop computers can attest, the capacity and performance of these batteries degrades with age. It remains to be seen how long the latest generation of lithium-ion batteries developed specifically for electric cars will last. The cycle lives and shelf lives measured in the laboratory do not always tally with what happens in actual use due to the many unforeseen circumstances that will be experienced in typical driving conditions.

There is a very real danger that the electric cars we build today may not save the additional energy required for their manufacture. If the battery lifetime is low, the likelihood that the net energy balance will be negative is high. Instead of helping to reduce overall $CO_2$ emissions, electric vehicles made with large, short-lived batteries could actually increase our energy consumption, thereby accelerating global warming. If a battery in an electric car is cycled on average once per day, the battery should have a cycle life far in excess of 5,000 cycles to guarantee that the vehicle will continue to operate for 10 years. Many vehicle owners expect their cars to last significantly longer than this—it is not unusual to see cars that are 30 years old on the roads. The prohibitive cost of replacing a battery in an old electric car will persuade most owners to purchase a new vehicle and the energy required to fabricate an automobile from scratch will be significantly more than that required to fabricate the battery alone. It is therefore desirable that the expensive and critical components used in the vehicular power systems of tomorrow be robust with lifetimes that far exceed what chemical batteries have been able to achieve.

The main reason that electrochemical batteries have limited lifetimes is because their electrodes undergo chemical changes during charging and discharging. These can be in the form of phase changes, structural changes and/or volume changes, all of which can severely degrade the integrity of the electrodes over time and reduce the capacity of the battery. Indeed, the charging and discharging processes in the latest generation lithium-ion batteries must be carefully controlled—overcharging or over-discharging can limit the performance and cause premature failure of the battery.

In contrast, capacitors store their energy as electrical charge on the electrodes. No chemical changes are involved and most capacitors have cycle lives of a million cycles or more, to 100% depth-of-discharge. Capacitors can also be charged and discharged orders of magnitude faster than electrochemical batteries making them particularly attractive for capturing rapidly released energy during regenerative braking. Indeed, many of today's hybrid-electric, plug-in hybrid electric and all-electric vehicles already utilize supercapacitors for this purpose. This provides further proof of the robustness and cycle life of capacitors—brakes often run extremely hot and braking occurs much more frequently than once per day!

Traditional electrostatic and electrolytic capacitors are used widely in electrical circuit applications but can store only relatively small amounts of energy per unit weight or volume. The emergence of electrochemical double layer (EDL) capacitors has now provided a viable alternative to traditional electrochemical batteries where power density and cycle life are more important than energy density. In fact, the latest generation of EDL Supercapacitors have specific energies of ~25 Wh/kg, approximately the same as lead-acid electrochemical batteries.

PRIOR ART

The key enabling technology for the power system described herein is the use of a molten salt electrolyte based supercapacitor that typically runs above ambient temperature and that has a high specific energy comparable to electrochemical batteries. Thus, prior art consists of both the power systems used to drive today's vehicles and the supercapacitors themselves: the current state-of-the-art of the latter being unsuitable for use as the main power providing component in the former.

Most of the vehicles on the road today fall into one of the following categories: those powered by internal combustion engines (ICEs), hybrid-electric vehicles that use an internal combustion engine together with a battery pack, plug-in hybrid electric and all-electric vehicles that use rechargeable electrochemical batteries and vehicles that are powered by fuel cells. Many of these vehicles are already equipped with regenerative braking systems that use supercapacitors to recover energy during braking.

It has long been appreciated that very large capacitances exist at the interface between an electrolyte and an irreversible electrode. See R. Kotz and M. Carlen, "Principles and Applications of Electrochemical Capacitors," *Electrochimica Acta* 45, 2483-2498 (2000).

This phenomenon is exploited in today's commercially available electrochemical double layer (EDL) supercapacitors (sometimes referred to as "ultracapacitors"). See "Basic Research Needs for Electrical Energy Storage", *Report of the Basic Energy Science Workshop in Electrical Energy Storage*. U.S. Department of Energy, April 2007."

The accepted mechanism for this dates back to 1853, when von Helmholtz discovered the electrochemical double layer. See H. von Helmholtz, *Ann. Phys.* (Leipzig) 89 (1853) 211.

Figure 1:
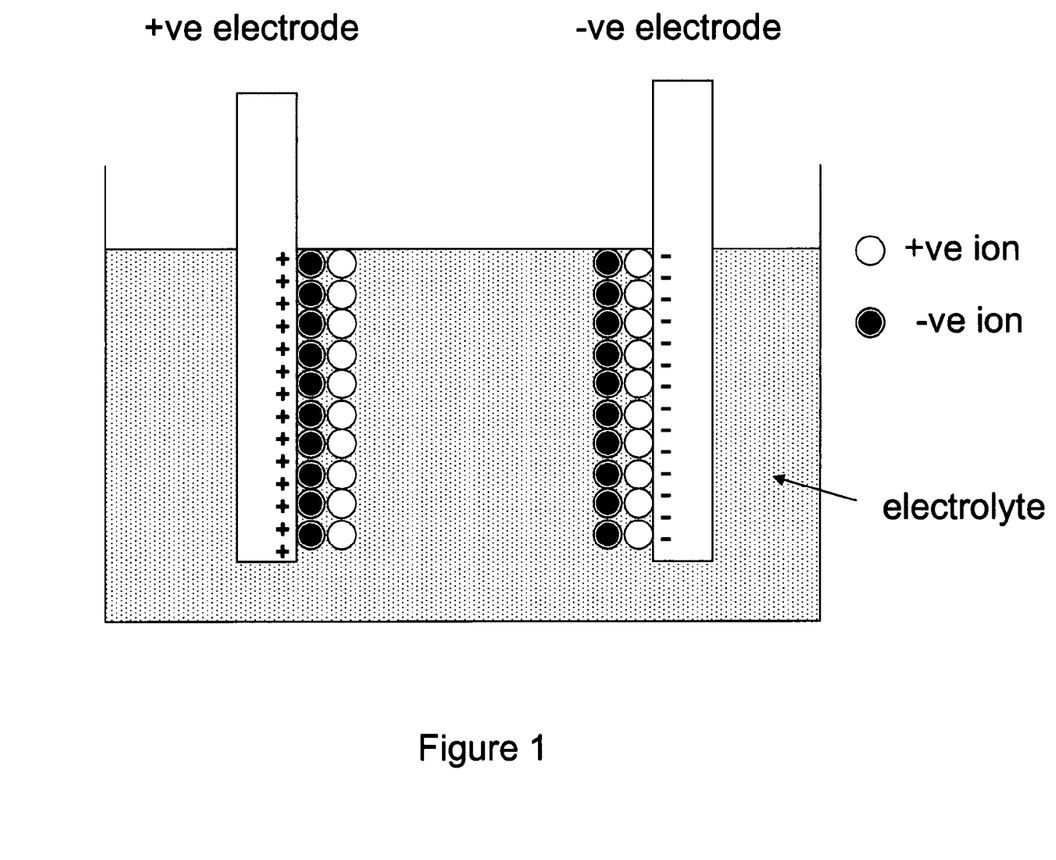
FIG. 1 is a schematic view of an electrochemical double layer according to one embodiment of the present invention.

If two electrodes are immersed in an electrolyte, a single layer of negative ions from the electrolyte will form in close proximity to the positive electrode and a second layer of positive ions from the electrolyte will form proximate the aforementioned negative ions, forming the so-called "Helmholtz double layer." A similar process occurs at the opposite negative electrode, though in this case the positive ions form the layer closest to the electrode—this is shown schematically in FIG. 1.

Because this double layer forms only at the interface between electrode and electrolyte, it is necessary to create a structure that maximizes this interfacial region. Traditionally, EDL supercapacitors have been made with high surface area carbon powders and aqueous electrolytes. See B. E. Conway, Electrochemical Supercapacitors—Scientific Fundamentals and Technological Applications, Kluwer, N.Y., 1999.

However, the capacitance of an EDL supercapacitor does not always scale with surface area. The most porous carbon powders with the highest surface areas as measured by BET methods sometimes have lower capacitances than other, lower surface area materials. This is usually explained as due to the fact that some pores are the wrong size to form double layer structures.

More recent EDL supercapacitors have used organic solvent-based electrolytes (K. Yuyama, G. Masuda, H. Yoshida, and T. Sato, "Ionic liquids containing the tetrafluoroborate anion have the best performance and stability for electric double layer capacitor applications," *Journal of Power Sources* 162, 1401 (2006)) or even polymeric electrolytes ("Polymer Capacitor Catching Up with Li-ion Battery in Energy Density", http://techon.nikkeibp.co.jp/english/NEWS_EN/20090615/171726/) to boost the maximum voltage between electrodes without initiating electrolysis of the electrolyte. This in turn boosts the maximum energy that can be stored in these capacitors. Recently, Eamex Corporation has claimed an energy density of 600 Wh/liter for a hybrid-EDL supercapacitor that contains a negative electrode that can reversibly incorporate mobile lithium ions from the polymeric electrolyte.

U.S. Pat. No. 5,585,999 describes a supercapacitor based on a thin-film palladium electrode acting as a reversible redox-active positive electrode and an organic chloroaluminate molten salt. See U.S. Pat. No. 5,585,999, H. C. De Long and R. T. Carlin, "Supercapacitor Electrochemical Cell", (1996).

The cell acts as a hybrid or pseudo-capacitor because during charging, the Pd thin-film is converted to $PdCl_2$, which is reduced to Pd during discharging. Concomitantly during discharging, Al from the negative electrode dissolves in the electrolyte and must be plated out during charging.

DISADVANTAGES OF THE PRIOR ART

Clearly, there is a need to use our remaining oil supplies wisely—burning what is left in internal combustion engines when a viable alternative exists seems imprudent. However, unless the net energy balance of hybrid-electric, plug-in hybrid electric and all-electric vehicles is positive, i.e., we save more energy by using them in place of ICE-powered cars than we consume to produce their batteries, we are deluding ourselves that the technology is "environmentally friendly." Furthermore, unless the batteries last at least as long as the rest of the vehicle, many vehicles will be retired earlier than necessary. The longer a battery pack's life, the more likely it will have a net positive energy balance. The limited cycle lives of today's Li-ion and NiMH batteries will require replacement prior to the end-of-life of many vehicles.

Other than the cost associated with providing a sufficient maximum power output for real world driving situations, there are few disadvantages to vehicles operating on fuel cells. However, it is the purpose of this invention to describe a system that improves on a vehicle operating on a fuel cell alone. For example, if one wishes to make use of regenerative braking or photovoltaic panels on the car's exterior to improve the overall energy efficiency, a battery and/or a capacitor would be required in addition to a fuel cell. The invention described herein uses a new kind of supercapacitor with the energy storage density of an electrochemical battery that is suitable, in combination with a fuel cell, to act as a power system for a vehicle.

Compared to electrochemical batteries, existing EDL supercapacitors store relatively small amounts of electrical energy per unit mass or volume and they are electrically leaky, meaning that they cannot store their charge over extended periods of time. Until relatively recently, supercapacitors lacked the energy density (energy per unit volume) and specific energy (energy per unit mass) to be used as the primary electrical storage device for vehicular propulsion. However, even with the advent of supercapacitors with specific energies of 25 Wh/kg, they are still unsuitable for the primary electrical storage device because they are too electrically leaky. Even if fully charged, they will discharge overnight unless they are plugged in to a power outlet. This might be possible if the car is in its owner's garage but it will not always be practical. During vehicular operation, a fuel cell can be used to keep the supercapacitor charged, only to discharge fully when the vehicle is turned off.

EDL supercapacitors have lower cycle lives and peak power output than electrostatic capacitors, though here they are vastly superior to electrochemical batteries. Their liquid electrolytes require hermetically sealed packages and also preclude their use in "System in a Package" microelectronic applications where all solid-state thin-film lithium batteries are preferred. See B. Neudecker, "Volume PVD Manufacturing of Rechargeable Thin-Film Batteries", Semicon West 2008 TechXpot, San Francisco Calif., July 2008.

In addition, their liquid and organic polymer electrolytes limit the maximum temperature that existing supercapacitors can withstand without failure during fabrication and operation.

The aforementioned hybrid-EDL supercapacitor that uses one electrode that can reversibly incorporate mobile lithium ions from the polymeric electrolyte has one of the drawbacks associated with electrochemical batteries, namely that chemical changes take place during charge/discharge cycles (in the reference above, "Polymer Capacitor Catching Up with Li-ion Battery in Energy Density",) lithium ions undergo a redox reaction at the negative electrode, forming a lithium alloy when the device is charged). Such chemical reactions may compromise the overall cycle life of these hybrid capacitors. Similar concerns apply to the Pd thin-film and Al electrodes described in U.S. Pat. No. 5,585,999, both of which are chemically changed when the capacitor is cycled.

OBJECTS OF THE INVENTION

Based on the limitations of the prior art, there is a need for an improved power system for a vehicle.

Nothing in the prior art provides the benefits attendant with the present invention. Therefore, it is an object of the present invention to provide an improvement which overcomes the inadequacies of the prior art.

Another object of the present invention is to provide a power system for a vehicle comprising: a supercapacitor-like electronic battery; a battery charger operatively connected to said supercapacitor-like electronic battery, said battery charger providing energy to said supercapacitor-like electronic battery; a heater operatively connected to said supercapacitor-like electronic battery, said heater providing energy to heat said supercapacitor-like electronic battery to lower the internal impedance of said supercapacitor-like electronic battery; a charging apparatus operatively connected to said battery charger; a motor operatively connected to the vehicle and said supercapacitor-like electronic battery; and a feedback loop controller operatively connected to said heater, said supercapacitor-like electronic battery and said motor.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The current invention combines a fuel cell, a high energy density supercapacitor and a battery into a system for electric vehicle propulsion. The enabling technology for this system is the use of a novel high energy density supercapacitor to drive the primary electric motor (or motors) that propel the vehicle.

An EDL supercapacitor fabricated by combining metallic powders and molten salt electrolytes according to the current invention can provide sufficient energy density to act as the primary electrical storage device in an electric vehicle. During vehicular operation, the supercapacitor is continuously charged by a fuel cell operating on chemical energy. The supercapacitor can also absorb the energy released rapidly during braking or more gradually from photovoltaic panels or paint on the vehicle's exterior. When the vehicle starts, an electrical circuit heats the supercapacitor and in some embodiments, the fuel cell. The electrical energy required to perform this heating is stored in an inexpensive chemical battery, which could be a typical lead acid battery used for starting, lighting and ignition in today's ICE-powered cars, or a more advanced rechargeable battery such as NiMH or Li-ion. Once the fuel cell and supercapacitor are at temperature, they can recharge the chemical battery.

When the vehicle is parked and the motor turned off, the supercapacitor and fuel cell are allowed to cool. The molten salt electrolyte in the supercapacitor solidifies, significantly increasing the internal impedance and thereby drastically reducing the electrical leakage. In a preferred embodiment the state of charge in the supercapacitor is monitored even after the motor is turned off, and the fuel cell continues to run until the supercapacitor and auxiliary battery are fully charged. When this point is reached, the fuel cell turns off and the molten salt electrolyte in the supercapacitor is allowed to solidify.

A feature of the present invention is to provide a power system for a vehicle comprising a supercapacitor-like electronic battery that is operatively connected to a battery charger. The supercapacitor-like electronic battery can further comprise a plurality of nanocomposite electrodes, an electrolyte in contact with the nanocomposite electrodes and a conductive material. At least one of the nanocomposite electrodes can be formed from a first electrolyte and a first conductive material. The first electrolyte can further comprise a molten salt that has a melting point in a range of 60° C. to 200° C. The electrolyte can further comprise a porous solid infiltrated with a liquid electrolyte or a porous solid infiltrated with a molten salt that has a melting point in a range of 60° C. to 200° C. The electrolyte can further comprise a nanocomposite. The nanocomposite can further comprise a ferroelectric material and an electrolyte. The ferroelectric material can further comprise a relaxor ferroelectric material. The electrolyte can be selected from the group consisting of a mixture of alkali metal nitrates, a mixture of alkali metal aluminochlorides with aluminum chloride or a mixture of aluminum and zinc chlorides. The battery charger provides energy to the supercapacitor-like electronic battery. A heater is operatively connected to the supercapacitor-like electronic battery to provide energy to heat the supercapacitor-like electronic battery to lower the internal impedance of the supercapacitor-like electronic battery. A charging apparatus is operatively connected to the battery charger. The charging apparatus can further comprise a fuel cell that can be operatively connected to the heater or a second heater. A motor is operatively connected to the vehicle and the supercapacitor-like electronic battery. A feedback loop controller is operatively connected to the heater, the supercapacitor-like electronic battery and the motor.

In a preferred embodiment, at least one nanocomposite electrode can be formed from a first electrolyte and a first conductive material where the first conductive material has a first surface that is chemically reactive to mobile ions contained in the first electrolyte. The chemical reaction is confined to the first surface. The first conductive material exceeds the percolation limit. At least one nanocomposite electrode being formed from a second electrolyte and a second conductive material where the second conductive material is irreversible to mobile ions contained in the second electrolyte. The second conductive material exceeding the percolation limit.

In another preferred embodiment, at least one nanocomposite electrode is formed from a first electrolyte and a first conductive material where the first conductive material has a first surface that is chemically reactive to mobile ions contained in the first electrolyte. The chemical reaction is confined to the first surface. The first conductive material exceeds the percolation limit. At least one nanocomposite electrode is formed from a second electrolyte and a second conductive material where the second conductive material has a second surface that is chemically reactive to mobile ions contained in the second electrolyte. The chemical reaction is confined to the second surface. The second conductive material exceeds the percolation limit.

In another preferred embodiment, at least one nanocomposite electrode is formed from a first electrolyte and a first conductive material where the first conductive material has a first surface that is chemically reactive to mobile ions contained in the first electrolyte. The chemical reaction is confined to the first surface. The first conductive material exceeds the percolation limit. At least one nanocomposite electrode is formed from a second electrolyte and a second conductive material where the second conductive material is reversible to mobile ions contained in the second electrolyte. The second conductive material exceeds the percolation limit.

In another preferred embodiment, at least one nanocomposite electrode is formed from a first electrolyte and a first conductive material where the first conductive material is irreversible to mobile ions contained in the first electrolyte. The first conductive material exceeds the percolation limit. At least one nanocomposite electrode is formed from a second electrolyte and a second conductive material where the second conductive material is irreversible to mobile ions contained in the second electrolyte. The second conductive material exceeds the percolation limit.

In another preferred embodiment, at least one nanocomposite electrode being formed from a first electrolyte and a first conductive material where the first conductive material is reversible to mobile ions contained in the first electrolyte. The first conductive material exceeds the percolation limit. At least one nanocomposite electrode is formed from a second electrolyte and a second conductive material where the second conductive material is irreversible to mobile ions contained in the second electrolyte. The second conductive material exceeds the percolation limit.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION OF THE INVENTION

The current invention describes a device structure and manufacturing method to fabricate an electrochemical double layer supercapacitor with a molten salt electrolyte: we prefer to call this device an electronic battery, because although it behaves like a capacitor, storing charge at the interface between the electrodes and dielectric, the amounts of energy that can be stored per unit volume (energy density) and per unit mass (specific energy) are more typical of a battery than a capacitor. The electronic battery is made by combining metallic powders and molten salt electrolytes to form the composite electrode structures; every other pair of electrodes is separated by a thin dielectric. Although this device is primarily intended to be incorporated into a system for electric vehicle propulsion, the device can also be made as a thin-film stack, making it suitable for use in place of thin-film batteries for some MEMS (Micro-ElectroMechanical Systems), SiP (System in a Package) and other microelectronic applications.

The current invention further describes a method for integrating this electronic battery containing molten salt electrolyte into a power system that incorporates means for charging the supercapacitor and means for providing stored energy to heat the supercapacitor to a temperature above ambient that exceeds the melting point of the electrolyte thereby substantially lowering the internal impedance of the capacitor. This is illustrated schematically in FIG. 2.

Figure 3:
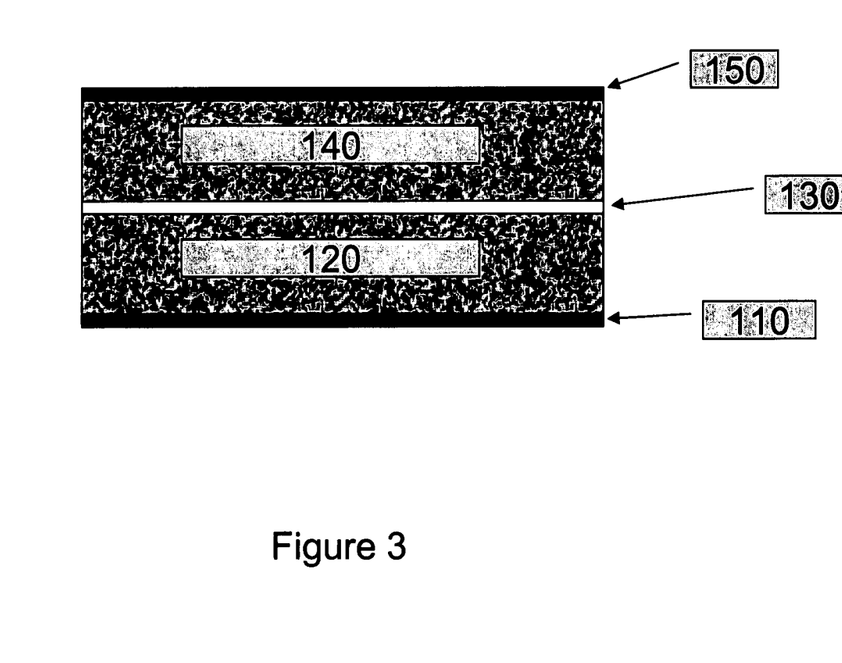
FIG. 3 is a schematic cross-section view of a single layer electronic battery according to one embodiment of the present invention.

A schematic of the cell structure of an electronic battery is shown in FIG. 3 as a first current collector 110, a first electrode 120, a separator 130, a second electrode 140 and a second current collector 150. The basic concept is very similar to existing EDL supercapacitors and electrochemical batteries, but there are some important differences. First, each electrode is fabricated from a molten salt electrolyte in its solid form and a conductive material that is irreversible to the mobile ions contained in the electrolyte. This differs from electrochemical batteries which typically use conductive electrode materials that are reversible to the mobile ions in the electrolyte. An irreversible electrode prevents mobile ions from crossing the interface from electrolyte into the electrode when current is passed through the external circuit; a reversible electrode allows mobile ions to cross the interface from the electrolyte during the passage of current through the external circuit, thus the electrodes in electrochemical batteries undergo chemical changes during charging and discharging. These can take the form of phase changes, structural changes and/or volume changes, all of which can severely degrade the integrity of the electrodes over many charge-discharge cycles and reduce the capacity of the batteries. In contrast, an irreversible electrode/electrolyte interface results in charge separation across the interface due to the formation of the Helmholtz double layer (FIG. 1). This double layer structure persists until a potential across the electrodes is reached that is sufficient to allow the onset of electrolysis. As long as electrolysis does not occur, a capacitor fabricated thus can undergo hundreds of thousands or even millions of charge/discharge cycles without undesirable chemical changes occurring. In addition, because of the absence of chemical processes within the electrodes, charge can be absorbed or released very rapidly by such a capacitor, allowing for rapid charging/discharging and very high power densities.

The electronic battery differs from traditional EDL supercapacitors because it is fabricated from molten salt rather than aqueous or non-aqueous liquid or polymeric electrolytes. It must therefore be fabricated by different methods from existing EDL supercapacitors.

The amount of energy that can be stored in an electronic battery depends critically on the electrode/electrolyte interfacial area and on the voltage across the electrodes. Electrode and electrolyte material that is not a part of the electrochemical double layer structure will not contribute to the amount of energy stored, therefore it is important that electrode and electrolyte material be intimately mixed at the atomic or molecular level. Such a structure could be characterized as a nanocomposite.

For a single cell, the maximum voltage across the electrodes is limited by the electrochemical stability range of the electrolyte. For thermodynamic stability, this is limited to ~7V, though some electrolytes have kinetic stability limits that are significantly higher.

Figure 4:
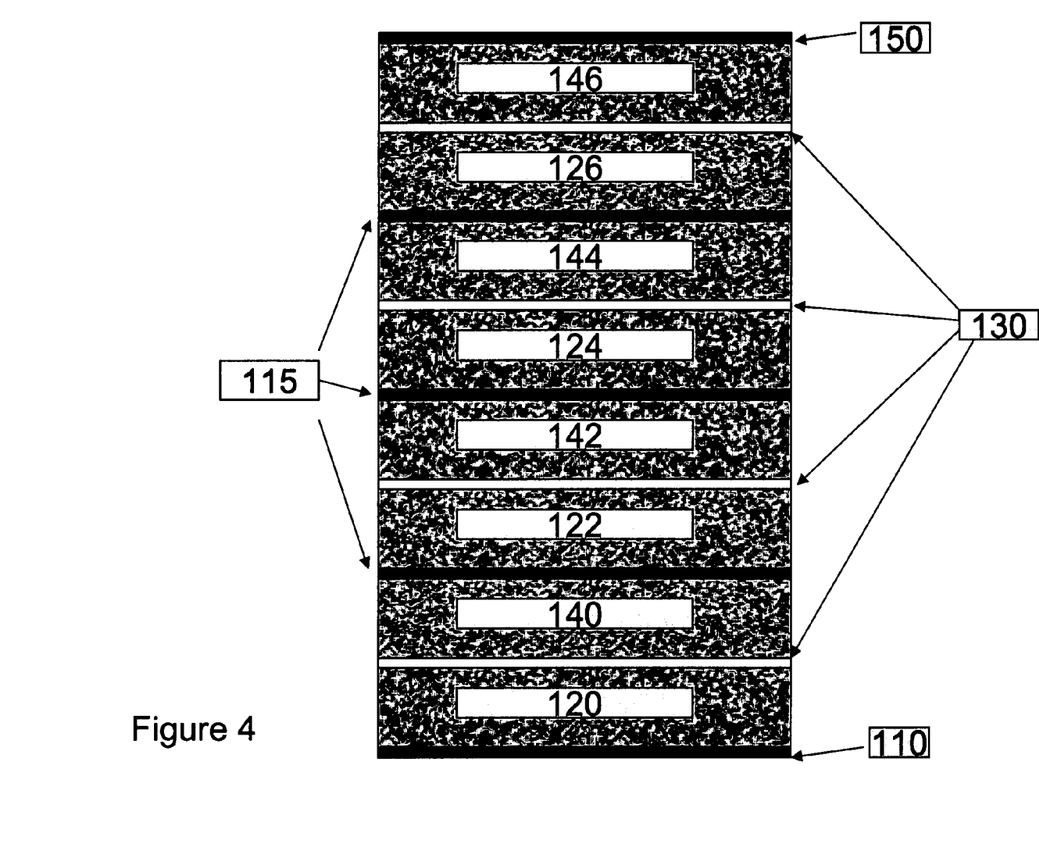
FIG. 4 is a schematic cross-section view of a multi-layer electronic battery according to one embodiment of the present invention.

A schematic of a multi-layer electronic battery is shown in FIG. 4 as a first current collector 110, a first electrode 120, separators 130, a second electrode 140, conductive barriers 115, a second current collector 150, a third electrode 122, a fourth electrode 142, a fifth electrode 124, a sixth electrode 144, a seventh electrode 126 and eighth electrode 146. By stacking individual cells together as shown in FIG. 4, it is possible to fabricate electronic batteries with much higher operating voltage ranges (hundreds of volts, kV or even MV), limited only by practical considerations. Such stacks would require control circuitry to account for differences in impedance between the various cells during charging and discharging, but this technology has already been developed for lithium-ion batteries (R. S. Tichy and M. Borne, "Building Battery Arrays with Lithium-Ion Cells", Micro Power Webinar, March 2009) and could easily be modified to function with high voltage serially connected electronic battery stacks.

In order to maintain the high power densities characteristic of capacitors, the impedance of the electrodes must be kept low. The amount of electronically conductive material contained in the electrode must exceed the percolation limit to ensure adequate electrical conductivity. The percolation limit depends on the properties of the electrode and electrolyte materials chosen. Typically, more conductive electrode materials exhibit lower percolation limits but the situation is complicated by the extremely small particle sizes contained in the electrode nanocomposite.

Even modest voltages across nanoscopic dimensions create very high electric fields. These can give rise to internal electrical leakage across the battery, a known problem for existing EDL supercapacitors. When the electrolyte is molten, the internal impedance of the battery is substantially lower and leakage will be high. By using a feedback loop to control the power to the electronic battery heater, the internal impedance can be adjusted to the power demands required of the battery. As the load on the motor driven by the electronic battery increases, power to the heating block is increased, thereby allowing the battery to deliver more power. If the load decreases, the battery is allowed to cool slightly, lowering the conductivity of the molten salt which in turn raises the internal impedance and reduces electronic leakage through the electrolyte. Allowing the electrolyte to solidify drastically lowers the conductivity of the electrolyte and leads to much lower internal leakage currents.

Although the primary application of this power system is vehicle propulsion, it can also be made small enough for use with MEMS devices and other microelectronic components. In these latter applications, because of the small size of the electronic batteries required, it may be cost effective to use thin-film deposition techniques, many of which have been developed for use in the semiconductor industry. More economical, scaleable techniques are required for vehicular applications. It is even possible to scale the molten salt electronic battery for even larger applications such as load leveling and peak shaving for power stations.

Figure 5:
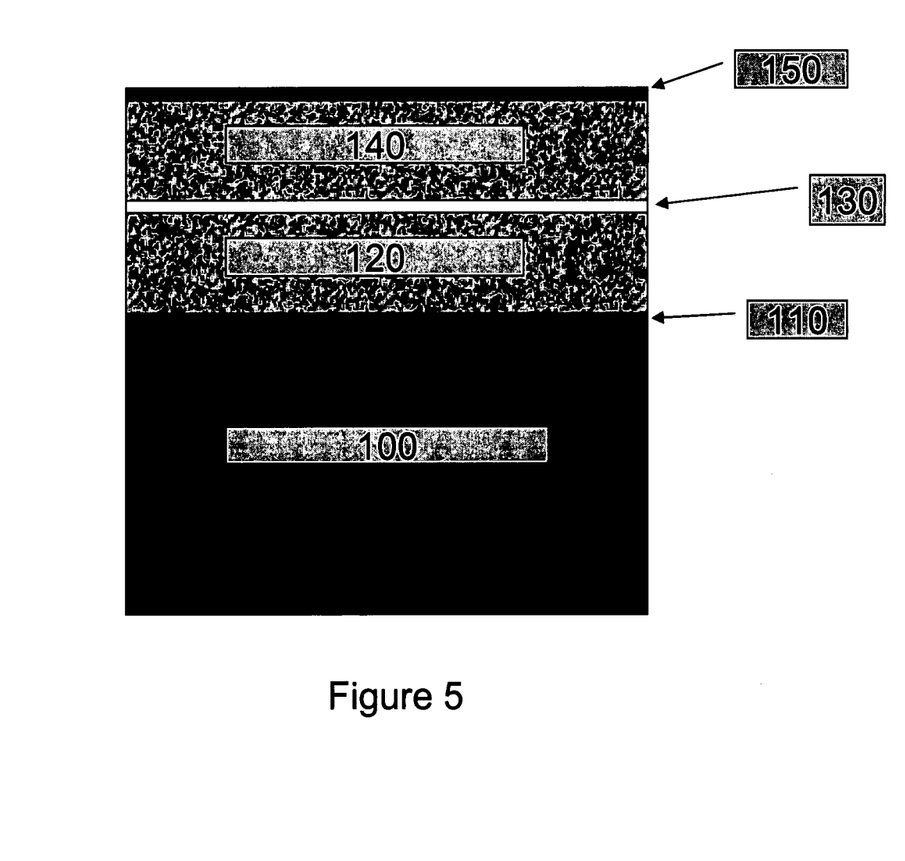
FIG. 5 is a schematic cross-section view of a thin-film electronic battery according to one embodiment of the present invention.

It is instructive to first consider the fabrication of a thin-film electronic battery (as illustrated schematically in FIG. 5). This can be fabricated as follows: a suitable substrate 100 is coated with a conductor that will serve as one of the current collectors 110 of the battery. This current collector material can be quite thin: in principle it can be as thin as 5 nm (50 Angstroms) though it would be more robust and could carry more current if it was thicker, with the preferred thickness being in the range of 100-500 nm (1,000-5,000 Angstroms). Preferably, the current collector 110 chosen should not react or alloy with the nanocomposite electrode 120, 140 at the temperatures experienced during fabrication and operation of the battery. It is especially critical that the current collector 110 does not react chemically with the molten salt electrolyte in the electrode 120, 140 nanocomposite. In many cases, the current collector 110 should be the same material that comprises the electronically conductive component of the nanocomposite electrode 120, 140 with which it is in contact. In some cases, it may be desirable to deposit a current collector 110 comprised of two or more layers consisting of different materials. For example, a thin Ti layer might be deposited directly onto the substrate 100 to ensure good adhesion between the substrate 100 and the current collector 110 during subsequent processing, a thin TiN (titanium nitride) layer might be deposited on top of the Ti to prevent reaction and/or inter-diffusion of the Ti with the other constituents of the current collector 110 stack, and a more conductive metal such as Pt or Ni might comprise the bulk of the current collector 110 stack. The current collector 110 can be deposited by a number of thin-film deposition techniques including but not limited to DC magnetron sputtering, RF magnetron sputtering, laser ablation, ion beam sputtering, thermal evaporation, e-beam evaporation, molecular beam deposition, chemical vapor deposition, plasma-enhanced chemical vapor deposition, atomic layer deposition, electroplating, electroless plating, sol-gel coating, plasma spray, twin wire arc spray, thermal spray and arc evaporation.

In some embodiments, the thin-film current collector stack can now be patterned according to techniques known in the semiconductor industry and familiar to those skilled in the art. Another option is to provide a mask to prevent deposition of subsequent films on unwanted regions of the current collector. This masking technique is only effective for line-of-sight physical vapor techniques such as DC magnetron sputtering, RF magnetron sputtering, laser ablation, ion beam sputtering, thermal evaporation, e-beam evaporation, molecular beam deposition, plasma spray, twin wire arc spray, thermal spray and arc evaporation.

The first electrode 120 can now be deposited onto the current collector 110. The first electrode 120 comprises a nanocomposite material that contains both electrically conducting and ionically conducting components, the latter being the molten salt electrolyte. The overall composition of the electrode should be electrically conductive—this can be achieved by ensuring that sufficient amounts of conductive material are included. For energy storage purposes, the optimum ratio of electrically conducting material to ionically conducting material should be adjusted so that an electrochemical double layer forms around the surface atoms of each nanoscopic grain of conductor. This ratio is likely to be optimized at close to equal molar ratios of each component, but the exact number depends on the materials properties of the individual nanomaterials. In practice, however, it may be necessary to increase the fraction of electronic conductor over this optimum theoretical ratio to assure adequate electrical conductance of the electrode 120.

The first electrode 120 can be deposited by any of the techniques listed earlier that can be used to deposit the current collector 110 onto the substrate 100, including but not limited to DC magnetron sputtering, RF magnetron sputtering, laser ablation, ion beam sputtering, thermal evaporation, e-beam evaporation, molecular beam deposition, chemical vapor deposition, plasma-enhanced chemical vapor deposition, atomic layer deposition, electroplating, electroless plating, sol-gel coating, plasma spray, twin wire arc spray, thermal spray and arc evaporation. It is important that the components of the electrode be intimately mixed at the nanoscale to ensure that the maximum number of conductive atoms or molecules are adjacent to electrolyte molecules. If the electrode 120 is prepared by sputtering, evaporation or spray techniques, the electronic conductor and electrolyte should be co-deposited concurrently to ensure this result. Chemical deposition techniques such as chemical vapor deposition or plating should use cycles that deposit first one component and then another. The duration of these cycles should be sufficiently small compared to the overall deposition rate to ensure that only a few monolayers of each component are deposited in a single cycle.

The temperature of the substrate 100 during deposition should be kept sufficiently low to avoid unwanted chemical reactions between the components of the electrode 120. If the surface tension of the molten salt electrolyte in the electrode 120 is sufficiently high that it does not flow out during deposition, it is permissible to exceed the melting point of the electrolyte. Otherwise, it is important that the substrate temperature remain below the melting point of the electrolyte during deposition and it may be necessary to employ substrate cooling to ensure this. In a preferred embodiment, the deposition is carried out at a temperature where the electrolyte softens but does not melt—this typically results in denser electrode structures.

After depositing the first electrode 120, it is necessary to deposit a dielectric separator 130 to prevent internal shorting of the electronic battery. This dielectric separator 130 is made in a manner analogous to the first electrode 120: it should contain a combination of a dielectric that is solid at the operating temperature of the battery, impregnated with molten salt electrolyte. Again, the deposition temperature must be controlled to avoid unwanted chemical reactions between the components of the separator 130 and to prevent outflow of the molten electrolyte. Preferably, the separator 130 should be thick enough to be continuous, pinhole-free and to prevent significant internal leakage currents caused by tunneling and other mechanisms when the electrolyte is solidified, even when the battery is fully charged. In practice, the separator 130 thickness will be in the range 10 nm (100 Angstroms)—2 microns. It can be deposited by similar techniques to those used to deposit the current collector 110 onto the substrate 100 and the first electrode 120, including but not limited to DC magnetron sputtering, RF magnetron sputtering, laser ablation, ion beam sputtering, thermal evaporation, e-beam evaporation, molecular beam deposition, chemical vapor deposition, plasma-enhanced chemical vapor deposition, atomic layer deposition, electroplating, electroless plating, sol-gel coating, plasma spray, twin wire arc spray, thermal spray and arc evaporation.

If the separator 130 is prepared by sputtering, evaporation or spray techniques, the solid dielectric and electrolyte should be co-deposited concurrently to ensure intimate mixing of the components. Chemical deposition techniques such as chemical vapor deposition or plating should use cycles that deposit first one component and then another. The duration of these cycles should be sufficiently small compared to the overall deposition rate to ensure that only a few monolayers of each component are deposited in a single cycle.

All materials contained in the dielectric separator 130 should be chemically compatible with all materials that constitute the electrodes 120, 140. A preferred embodiment uses a combination molten salt electrolyte/ferroelectric dielectric separator 130. The displacement currents that operate in ferroelectrics serve to reduce the overall internal field within conventional electrostatic capacitors, thereby increasing the amount of charge stored on the electrodes 120, 140 for a given potential difference. Energy is also stored by displacement of partially mobile ions inside the crystal lattice of the ferroelectric material. The ferroelectric material can be chosen to have a Curie point significantly below the operating temperature of the electronic battery in which case it will have a remnant polarization after the cell plates are charged. Alternatively, the ferroelectric material chosen can be a relaxor ferroelectric where the operating temperature of the battery is close to the Curie point of the dielectric. Another embodiment uses an internal barrier layer capacitor (IBLC) material which comprises grains of semiconducting or insulating material, typically with a high relative permittivity, with a separate ionically conductive phase in the grain boundaries. See D. C. Sinclair, T. B. Adams, F. D. Morrison, and A. R. West, "$CaCu_3Ti_4O_{12}$: One-step internal barrier layer capacitor", *Appl. Phys. Lett.* 80, 2153 (2002).

A preferred embodiment uses the same molten salt electrolyte in the dielectric separator 130 as is incorporated into the electrodes 120, 140.

The second electrode 140 is then deposited onto the dielectric separator 130 in a manner similar to that used for the first electrode 120 employing any of the techniques listed earlier, including but not limited to DC magnetron sputtering, RF magnetron sputtering, laser ablation, ion beam sputtering, thermal evaporation, e-beam evaporation, molecular beam deposition, chemical vapor deposition, plasma-enhanced chemical vapor deposition, atomic layer deposition, electroplating, electroless plating, sol-gel coating, plasma spray, twin wire arc spray, thermal spray and arc evaporation. Once again, it is important that the components of the second electrode 140 be intimately mixed at the nanoscale to ensure that the maximum number of conductive atoms or molecules are adjacent to electrolyte molecules. It should be noted that the components of the second electrode 140 do not have to be identical to those used for the first electrode 120, but as for the first electrode 120, the temperature of the substrate 100 during deposition should be controlled to avoid unwanted chemical reactions between the components of the second electrode 140 and to avoid outflow of the electrolyte.

Following deposition of the second electrode 140, a second current collector 150 is deposited in a manner similar to that used earlier to deposit the first current collector 110 on the substrate 100. The materials used in this second current collector 150 might be the same as were chosen for the first current collector 110, but this is not a necessary condition—in some cases, different materials will be chosen, especially if the components of the first electrode 120 and the second electrode 140 are different.

Figure 6:
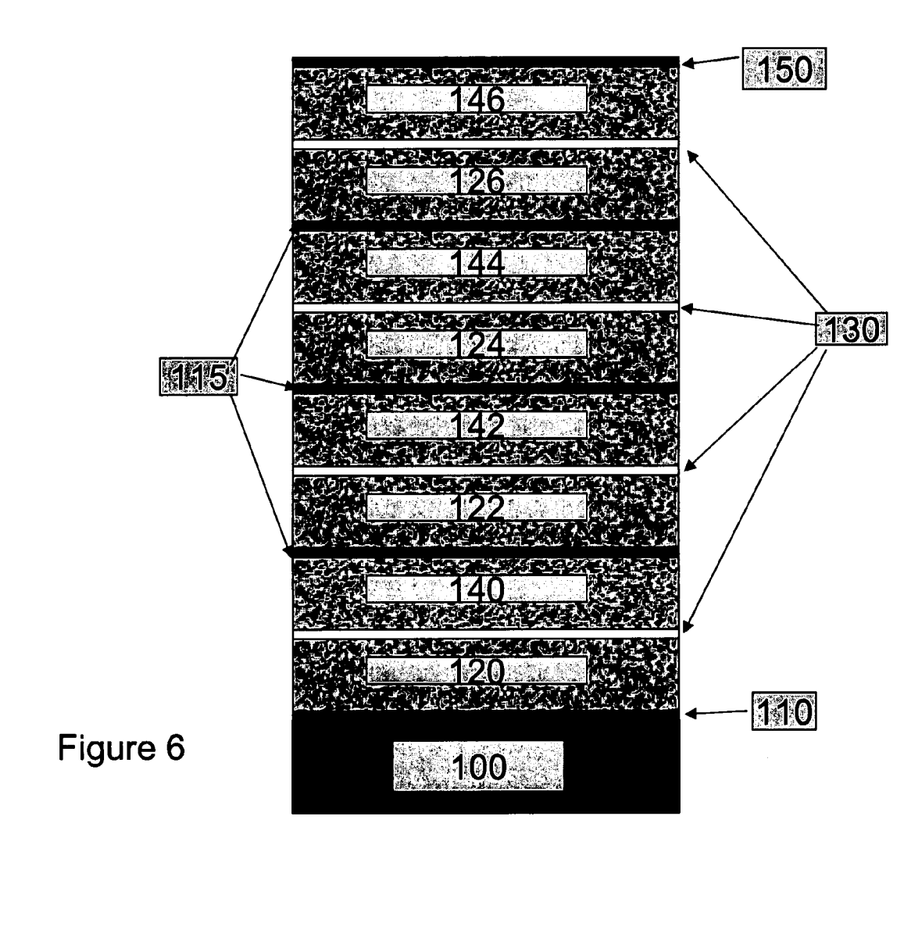
FIG. 6 is a schematic cross-section view of a multi-layer thin-film electronic battery according to one embodiment of the present invention.

If higher battery voltages or larger energy densities per unit area are required, thin-film electronic battery cells can be stacked on top of each other by repeating the steps required to deposit a third electrode 122 that is identical to the first electrode 120, another ultra-thin dielectric separator layer 130, a fourth electrode 142 that is identical to the second electrode 140 and another current collector 115. This procedure can be repeated multiple times if necessary. In this way, a thin-film electronic battery stack such as is shown schematically in FIG. 6 can be fabricated.

After all the active components of the thin-film electronic battery are deposited, it is necessary to deposit encapsulation. The part of the encapsulating layer in direct contact with the active components of the electronic battery must be electrically insulating and can be an organic polymer or an inorganic material. If an inorganic material is chosen, it should preferably be amorphous or a glass. A metal overlayer can be applied to the dielectric encapsulant if desired. The encapsulation layer can be comprised of one or multiple applications of various encapsulation materials. For example, in a preferred embodiment silicon nitride can be used as an encapsulation material. Given the inherent properties of silicon nitride as are apparent to those skilled in the art, oftentimes a second material, such as silicon oxide, is applied over the silicon nitride to ensure that the encapsulation layer hermetically seals the electronic battery. Other examples of materials which can be used as part of the encapsulation layer include silicon oxynitride, parylene, polymers or metals. The encapsulation also serves the purpose of avoiding the loss of molten salt electrolyte when the battery is at operating temperature though capillary forces will also act to prevent this.

The principles and materials involved in fabricating a larger electronic battery for vehicular and power station applications are very similar to those used to fabricate thin-film batteries. However, some thin-film deposition techniques, especially those involving vacuum deposition such as sputtering and evaporation, are too expensive for consideration for these larger devices. In addition, it now becomes optional to build the battery stack on a substrate since the overall structure will be massive enough that it can be contained in packaging that is free-standing. Thick film techniques such as screen printing, offset printing, ink jet printing and tape casting can now be used to fabricate these structures. The starting materials should be nanoparticles of electronic conductor and molten salt electrolyte in solid form, intimately mixed to maximize the number of conductor atoms or molecules that have electrochemical double layers formed at their surfaces. The nanoparticles can be prepared by co-precipitation or other techniques known to those skilled in the art. Care should be taken to prevent agglomeration of the individual nanoparticles during preparation of the nanocomposite electrodes and separators.

After the electronic battery is assembled and packaged, it should be polarized. This should be done by raising the battery temperature above the melting point of the molten salt electrolyte and applying the maximum rated voltage across the external contacts while monitoring the current until it decays to a constant value. Maximum capacity of the battery will be achieved when all the surface of the conductive material is in contact with an electrochemical double layer formed in the molten salt electrolyte.

When the electrolyte is molten, the ionic conductivity will be high and the electronic battery can be charged and discharged rapidly. The parasitic losses in the cell due to electronic leakage through the electrolyte will be significant but small relative to the overall operating power of the battery. The charging device (typically a fuel cell, but it could also be another means to generate electricity from chemical energy, e.g., an ICE connected to a generator) should be sized to generate sufficient charging power for the maximum average operating requirements. The additional power required from the charging device to compensate for the internal electrical leakage of the electronic battery will be small.

When the electrolyte solidifies, both the ionic conductivity and the electronic conductivity of the molten salt electrolyte drop drastically, raising the internal cell impedance and slowing the self discharge currents to negligible levels.

Figure 2:
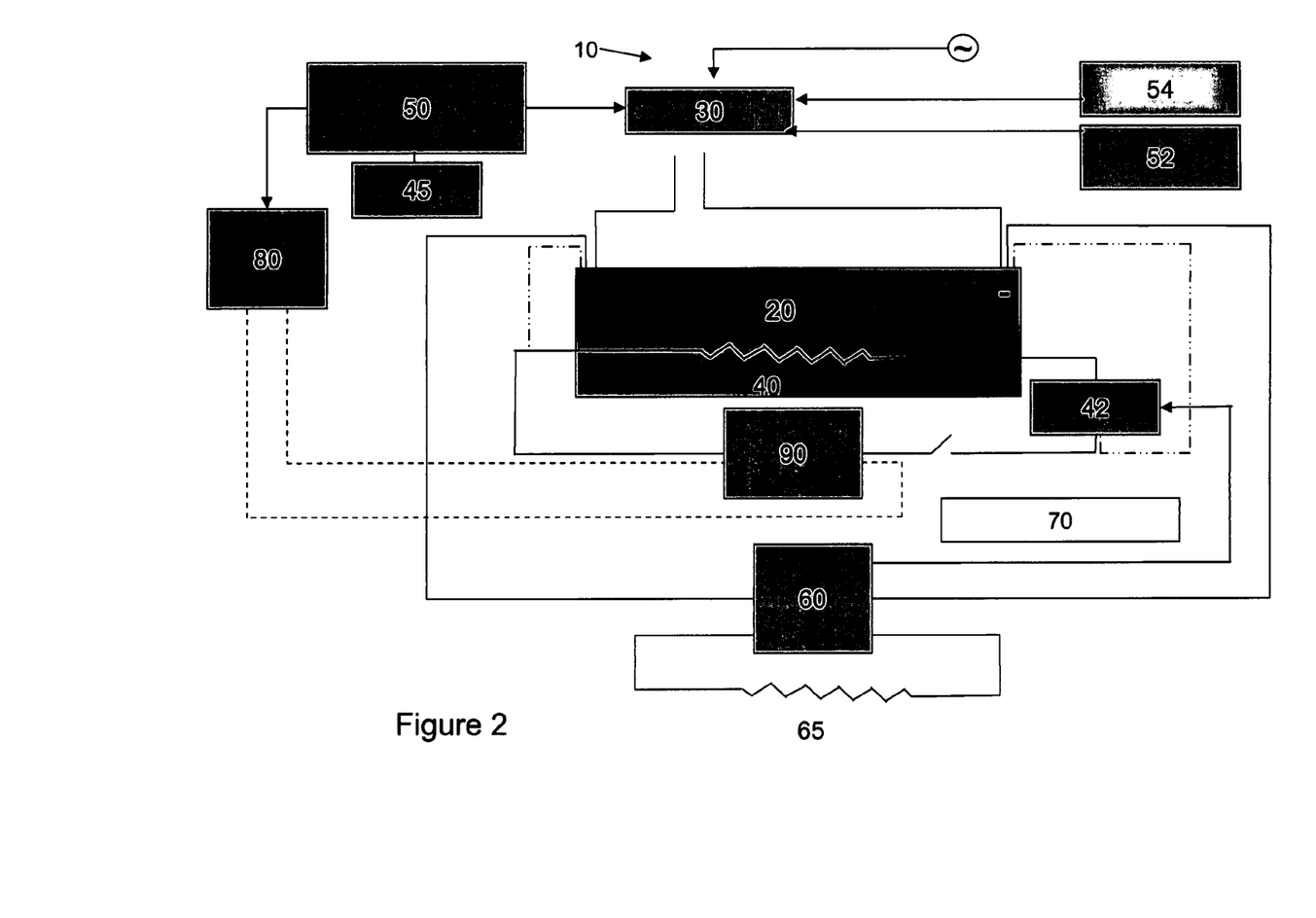
FIG. 2 is a schematic of a power system using an electric battery according to one embodiment of the present invention.

FIG. 2 illustrates a schematic of how this electronic battery 20 can be used in a power system 10 to drive an electric motor 60. The scheme described here is particularly advantageous for personal automotive transportation, i.e., passenger cars and electric bicycles, but the inventors do not wish to limit the scope of this invention solely to such functions. It will be apparent to those skilled in the art that similar systems could be used for larger vehicles and also for other applications where high performance electrical energy capture and storage are needed.

Referring to FIG. 2, a primary electric motor 60 drives a load 65 and is powered by an electronic battery 20 according to the current invention. The electronic battery 20 is charged by an electronic battery charger 30 which can be constructed according to known prior art. The electronic battery charger 30 is in turn powered by a power source 50. In a preferred embodiment, this is a fuel cell but it could also be another form of charging apparatus such as a generator powered by an internal combustion engine. In a preferred embodiment, the device used to power the electronic battery charger 30 should convert a store of chemical energy into electricity. In addition, other sources of electrical energy such as that produced by regenerative braking 52 and photovoltaic cells 54 can be used to charge the electronic battery 20 through the electronic battery charger 30. Plug and wiring (not shown) are also provided to attach the electronic battery charger 30 to a standard electrical outlet (not shown).

When the primary electric motor 60 is off and the electronic battery 20 is in its fully charged state, no current flows from the charging apparatus 50 to the electronic battery charger 30. Additionally, no current flows through the heater 40 in the electronic battery 20 which will cool to the temperature of the ambient surroundings. At this temperature, the molten salt electrolyte in the electronic battery 20 is in solid form, the internal impedance of the electronic battery 20 is high and the total electrical leakage current through the electronic battery 20 is very small. Thus, the system will store charge for long periods of time in its "off" state yet very soon after it is actuated, it will be capable of providing high power output.

When it is desired to start the system 10, a circuit is energized to provide current to the heater 40 in the electronic battery 20. The energy for this initial start up is stored in an auxiliary battery 90: this can be a relative small and therefore inexpensive electrochemical battery such as is typically used for starting, lighting and ignition in today's automobiles. When current flows through the heater 40, the temperature of the electronic battery 20 rises rapidly and the molten salt electrolyte therein melts. It is now possible for the electronic battery 20 to provide enough power to drive the primary electric motor 60. Other functions that require electrical energy such as heating, cooling, lighting and electronic equipment can also be powered by the electronic battery 20. When the electronic battery 20 is at operating temperature, internal leakage currents help to keep it warm, but part of the power output of the electronic battery 20 is used to provide current to the heater 40, thereby keeping the electrolyte in its molten state.

When the system 10 is turned off, the electronic battery 20 is allowed to cool. However, in one embodiment, the state of charge of the electronic battery 20 is monitored and it is maintained at operating temperature until the charging apparatus 50 restores it to its fully charged state. When this point is reached, the charging apparatus 50 turns off and the electronic battery 20 is allowed to cool, solidifying the molten salt electrolyte.

Typically, the ionic and electronic conductivities of molten salt electrolytes increases with increasing temperature. Higher ionic conductivity in the electronic battery 20 will lower the internal impedance and allow more power to be applied to the motor 60. However, higher electronic conductivity in the electrolyte increases internal leakage currents leading to a loss of efficiency. By adjusting the temperature of the electronic battery 20 according to the power demands of the primary electric motor 60, it is possible to improve the overall efficiency of the system 10. As the load 65 on the motor 60 driven by the electronic battery 20 increases, power to the heating block 40 is increased through the heat controller 42, thereby allowing the electronic battery 20 to deliver more power. If the load 65 decreases, the electronic battery 20 is allowed to cool slightly, lowering the conductivity of the molten salt which in turn raises the internal impedance and reduces electronic leakage through the electrolyte.

In some embodiments, it is also necessary to heat the charging apparatus 50, for example, when the charging apparatus 50 is a solid oxide fuel cell that operates at elevated temperature. This can be done by the auxiliary battery 90, the heater 40 for the electronic battery 20, a second heater 45 or alternatively, this can be provided by the electronic battery 20 after the electrolyte has melted.

Once the system 10 is operational, the auxiliary battery 90 can be restored to its fully charged state by an auxiliary battery charger 80 powered either by the charging apparatus 50, the electronic battery 20 or both. In a particularly preferred embodiment, the state of charge in the auxiliary battery 90 is monitored even when the system is idle—very little current would be required for this function. If the state of charge of the auxiliary battery 90 dropped below a critical value, a computer 70 would activate the charging apparatus 50 and recharge the auxiliary battery 90 to ensure that sufficient electrical energy was available to heat the electronic battery 20 (and in some embodiments, the fuel cell) to operating temperature when the system 10 was next activated. As long as chemical fuel remained in the reservoir, 'flat batteries' would be a thing of the past! When the auxiliary battery 90 nears end-of-life, a computer 70 would alert the operator to replace this inexpensive component. A plug that could be inserted into a standard electrical outlet would be provided for emergency starting. This would be electrically connected to the electronic battery heater 40 (and in some embodiments, to the fuel cell heater also).

Figure 7:
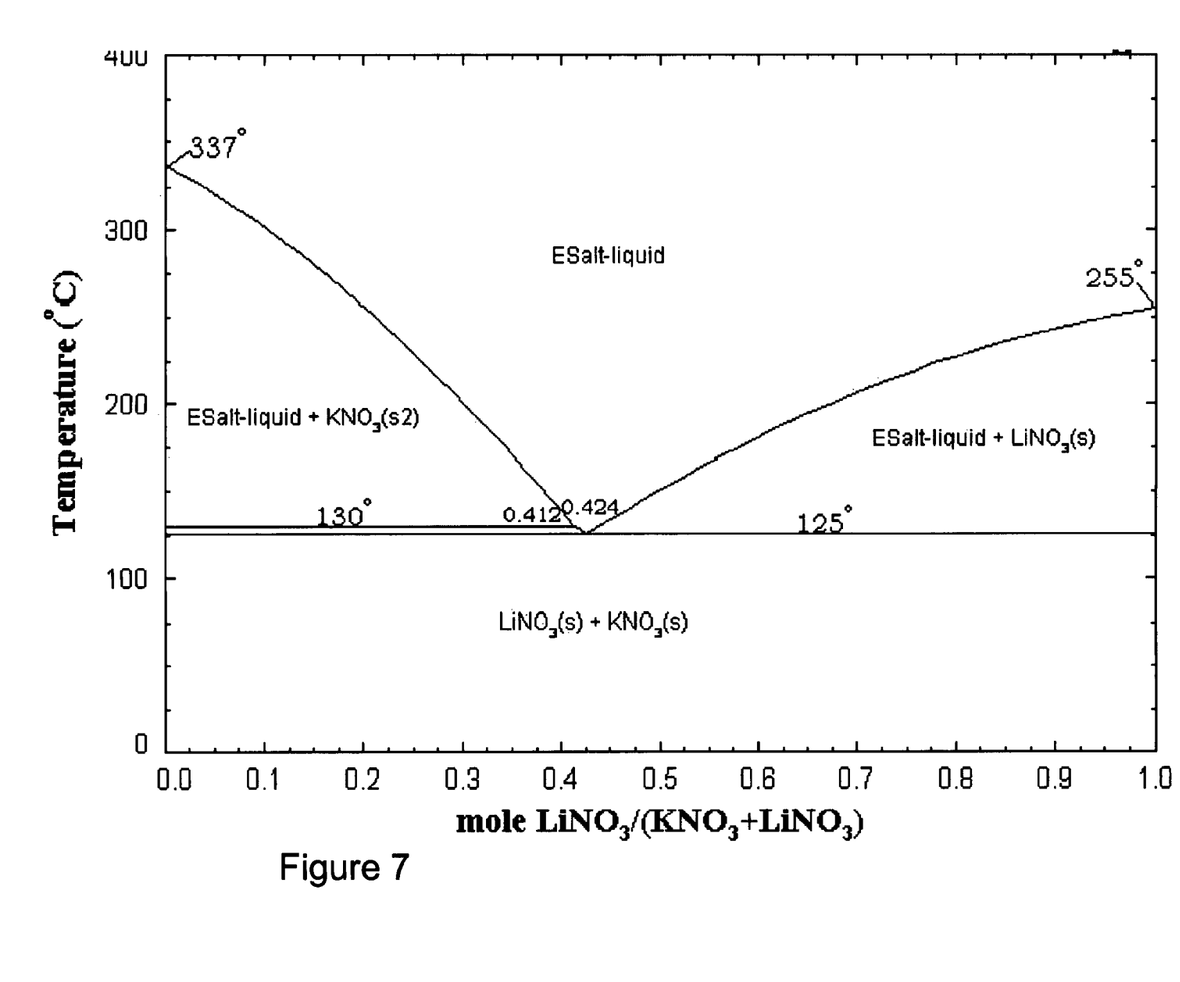
FIG. 7 is a phase diagram of $LiNO_3$—$KNO_3$.

Ideally, the electronic battery 20 should operate significantly above ambient temperature so that after current ceases to flow through the heater 40, cooling of the electrolyte and solidification is rapid. However, too high operating temperatures significantly increase internal electrical leakage, increase the energy required to heat up the electronic battery 20 to operating temperature and maintain it there, and also increase the likelihood of unwanted chemical reactions taking place between the constituents of the electronic battery 20. In very hot climates, the interior of a vehicle left in direct sunlight can exceed 60° C. Consequently, the minimum temperature for the melting point of the electrolyte should comfortably exceed this value. Fortunately, there are a number of organometallic and inorganic compounds that have melting points between 80° and 150° C. that are suitable candidates, including but not limited to eutectics of alkali metal nitrates (e.g., $LiNO_3$—$KNO_3$), mixtures of the alkali metal aluminochlorides with excess aluminum chloride (e.g., $LiAlCl_4$+$AlCl_3$, etc.) and the eutectic mixture of aluminum and zinc chlorides. If higher operating temperatures are required, the choice is expanded significantly. The $LiNO_3$—$KNO_3$ eutectic mixture melts at ~125° C. and has been proposed as a suitable molten salt electrolyte in lithium batteries. See U.S. Pat. No. 4,405,416, I. D. Raistrick, J. Poris and R. A. Huggins, "Molten Salt Lithium Cells" (1983). Its phase diagram is illustrated in FIG. 7.

It should be appreciated that the addition of other oxidizing species such as nitrites, borates, sulfates, phosphates and other nitrates to the $LiNO_3$—$KNO_3$ eutectic can lower the melting point further. Moreover, it is well known by those skilled in the art that extremely small nanoparticles can have effective melting points that are substantially lower than that of the bulk material; this effect can be used to advantage to tailor the properties of the nanocomposite electrodes contained in the electronic battery described here.

The authors of U.S. Pat. No. 5,585,999 claim that their device is capable of storing over 1,000 coulombs per gram and delivering this charge at ~1 volt. This is equivalent to a specific energy of ~278 Wh/kg, which compares very favorably with the best rechargeable lithium-ion batteries in use today. In light of this and despite the potential issues associated with the chemical changes that take place at the electrodes during cycling, this pseudo-capacitor warrants consideration as a candidate electronic battery for the purposes described herein. However, in the aforementioned patent, the authors describe a chloroaluminate electrolyte that is molten at room temperature. To function as an electronic battery in the power system described herein, the melting point of the electrolyte should be raised. A suitable alternative is a eutectic mixture of $NaAlCl_4$—$KAlCl_4$ to which a slight excess of $AlCl_3$ is added, with a melting point of ~125° C. Because of the high vapor pressure of $AlCl_3$, it is important to hermetically seal the device, though this is in any case generally desirable practice to prevent intrusion of water, atmospheric oxygen or $CO_2$ and other contaminants.

An example of an electronic battery fabricated according to the current invention and that uses a ferroelectric dielectric material as part of the separator is given below. This battery can be fabricated with the electrodes stacked on top of one another (as illustrated schematically in FIG. 4) or as a series of concentric rings arranged in a cylindrical configuration.

Current collector 1: Au
Electrode 1: Au+LiNO$_3$—KNO$_3$ eutectic composition (~41:59 mol %)
Dielectric Separator(s): BaTiO$_3$+LiNO$_3$—KNO$_3$ eutectic composition (~41:59 mol %)
Electrode 2: Au+LiNO$_3$—KNO$_3$ eutectic composition (~41:59 mol %)
Additional Electrodes (3, 4, etc.): As for electrodes 1 and 2.
Current collector 2: Au An example of a thin-film electronic battery suitable for MEMS or other microelectronic applications is given below. Note that in this particular example, it is preferred to deposit a silicon nitride barrier layer to prevent attack on the glass substrate by the alkali metal ions present in the molten salt electrolyte.

Substrate: Glass
Barrier Layer: Silicon nitride
Current collector 1: Ti/TiN/Pt
Electrode 1: Pt+LiNO$_3$—KNO$_3$ eutectic composition (~41:59 mol %)
Dielectric Separator: Porous alumina+LiNO$_3$—KNO$_3$ eutectic composition (~41:59 mol %)
Electrode 2: Pt+LiNO$_3$—KNO$_3$ eutectic composition (~41:59 mol %)
Current collector 2: Pt
Encapsulation: Silicon nitride Another example that uses a different electronic conductor in electrodes 1 and 2 and operates as a pseudo-capacitor rather than a true electrochemical double layer capacitor is given below. As taught in U.S. Pat. No. 5,585,999, electrode 1 can be deposited as an ultra-thin film of 1-10 monolayers on a carbon support. Alternatively, it can be fabricated according to the methods taught herein using thin-film and/or thick film techniques to co-deposit conductor and electrolyte.

Current collector 1: Pt
Electrode 1 (Positive electrode): Pd+NaAlCl$_4$—KAlCl$_4$ eutectic composition (~70:30 mol % with slight addition of AlCl$_3$ or LiAlCl$_4$)
Dielectric Separator: Porous alumina+NaAlCl$_4$—KAlCl$_4$ eutectic composition (~70:30 mol % with slight addition of AlCl$_3$ or LiAlCL$_4$)
Electrode 2 (Negative electrode): Al+NaAlCl$_4$—KAlCl$_4$ eutectic composition (~70:30 mol % with slight addition of AlCl$_3$ or LiAlCl$_4$)
Additional Positive Electrodes (3, 5, etc.): As for electrode 1.
Additional Negative Electrodes (4, 6, etc.): As for electrode 2.
Current collector 2: Al The examples given and materials chosen are intended to be entirely illustrative and are not meant to limit the scope of this invention. Moreover, although various characteristics and advantages of certain embodiments of the present invention have been highlighted herein, many other embodiments will be apparent to those skilled in the art without deviating from the scope and spirit of the invention disclosed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A power system for a vehicle comprising:
   a supercapacitor;
   a battery charger operatively connected to said supercapacitor, said battery charger providing energy to said supercapacitor;
   a heater operatively connected to said supercapacitor, said heater providing energy to heat said supercapacitor to lower an internal impedance of said supercapacitor;
   a charging apparatus operatively connected to said battery charger;
   a motor operatively connected to the vehicle and said supercapacitor; and
   a feedback loop controller operatively connected to said heater, said supercapacitor and said motor;
   wherein said supercapacitor further comprising:
   a plurality of nanocomposite electrodes;
   an electrolyte in contact with said nanocomposite electrodes; and
   a conductive material
   wherein at least one nanocomposite electrode being formed from a first electrolyte and a first conductive material,
   and said first electrolyte further comprising a molten salt.

2. The power system for a vehicle according to claim 1, wherein said molten salt having a melting point in a range of 60° C. to 200° C.

3. The power system for a vehicle according to claim 1, wherein said electrolyte in contact with said nanocomposite electrodes further comprising a porous solid infiltrated with a liquid electrolyte.

4. The power system for a vehicle according to claim 1, wherein said electrolyte in contact with said nanocomposite electrodes further comprising a porous solid infiltrated with a molten salt.

5. The power system for a vehicle according to claim 1, wherein said molten salt having a melting point in a range of 60° C. to 200° C.

6. The power system for a vehicle according to claim 1, wherein said electrolyte in contact with said nanocomposite electrodes further comprising a nanocomposite.

7. The power system for a vehicle according to claim 1, wherein said nanocomposite further comprising:
   a ferroelectric material; and
   an electrolyte.

8. The power system for a vehicle according to claim 7, wherein said ferroelectric material further comprising a relaxor ferroelectric material.

9. The power system for a vehicle according to claim 1, wherein said charging apparatus further comprising a fuel cell.

10. The power system for a vehicle according to claim 9, wherein said fuel cell is operatively connected to said heater.

11. The power system for a vehicle according to claim 9, wherein said fuel cell is operatively connected to a second heater.

12. The power system for a vehicle according to according to claim 1, wherein said electrolyte in contact with said nanocomposite electrodes is selected from the group consisting of a mixture of alkali metal nitrates, a mixture of alkali metal aluminochlorides with aluminum chloride, and a mixture of aluminum and zinc chlorides.

* * * * *

UNITED STATES PATENT AND TRADEMARK OFFICE
CERTIFICATE OF CORRECTION

PATENT NO. : 8,890,476 B2
APPLICATION NO. : 13/389370
DATED : November 18, 2014
INVENTOR(S) : Martienssen et al.

It is certified that error appears in the above-identified patent and that said Letters Patent is hereby corrected as shown below:

On the title page item (73), should read:
Assignee: Oerlikon Advanced Technologies AG, Balzers (LI);
 By Rosalinda Martienssen, Werner Oskar Martienssen (deceased), Dreieich, (DE)

Signed and Sealed this
Twenty-second Day of December, 2015

Michelle K. Lee
*Director of the United States Patent and Trademark Office*